(12) United States Patent
Jahr

(10) Patent No.: US 11,681,523 B1
(45) Date of Patent: Jun. 20, 2023

(54) METADATA MODEL AND USE THEREOF FOR CLOUD NATIVE SOFTWARE SYSTEMS

(71) Applicant: SAP SE, Walldorf (DE)

(72) Inventor: Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/588,585

(22) Filed: Jan. 31, 2022

(51) Int. Cl.
| | |
|---|---|
| *G06F 8/71* | (2018.01) |
| *G06F 9/445* | (2018.01) |
| *G06F 8/41* | (2018.01) |
| *G06F 9/455* | (2018.01) |
| *G06F 16/00* | (2019.01) |
| *G06F 16/25* | (2019.01) |
| *G06F 8/60* | (2018.01) |

(52) U.S. Cl.
CPC . *G06F 8/71* (2013.01); *G06F 8/60* (2013.01)

(58) Field of Classification Search
CPC ............ G06F 16/245; G06F 16/258; G06F 16/24573; G06F 16/2282; G06F 16/284; G06F 8/71; G06F 8/60
See application file for complete search history.

(56) References Cited

U.S. PATENT DOCUMENTS 11,294,927 B2 * 4/2022 Hrastnik ............... G06F 16/245
2022/0004992 A1    1/2022 Jahr

OTHER PUBLICATIONS

Mir et al., An Improved Metadata Model for Big Data Processing in Cloud Data Centers, 4 pages (Year: 2017).*

* cited by examiner

*Primary Examiner* — Thuy Dao
(74) *Attorney, Agent, or Firm* — Fish & Richardson P.C.

(57) ABSTRACT

Methods, systems, and computer-readable storage media for defining a metadata model representative of the software solution, the metadata model including a global model, a to-be model, and an as-is model, updating, by a first model updater, the global model to include metadata generated during execution of a release pipeline associated with the software solution, updating, by a second model updater, the to-be model to include metadata generated during execution of a deployment pipeline associated with the software solution, populating the as-is model with metadata generated as a result of deployment of the software solution to the one or more cloud platforms, the as-is model identifying versions of components of the software solution and respective deploy targets, to which the components are deployed to, and executing at least one management operation on the software solution at least partially based on the metadata model.

20 Claims, 10 Drawing Sheets

METADATA MODEL AND USE THEREOF FOR CLOUD NATIVE SOFTWARE SYSTEMS

BACKGROUND

Software solutions may be architected as distributed applications that leverage a mesh of software services called a service mesh. In such applications, each service is an independent software component that includes code and data used to execute complete and discrete functionality (e.g., record error logs). Services use common interface standards and can be communicated with over a network (e.g., Internet) using standard communication protocols. The services in a service mesh may be deployed on-premise and/or in the cloud.

Software solutions are deployed in multiple disparate patterns, which can include single stacks or multiple stacks. That is, for example, components of a software solution can all be deployed within a single cloud platform or can be distributed across multiple cloud platforms. Software solutions can also include relatively complex anatomies including multiple layers (e.g., components, tenants, landscapes). For example, software solution can rely on functionality provided by external services, which themselves can be distributed across multiple stacks.

However, in terms of managing solutions, the expectation is that a solution is managed as a whole instead of management of individual components, tenants, or portions of landscapes. Metadata representative of the solution can be used as input to management tasks, such as landscape management. To execute management, metadata models can be leveraged, which collectively represent a solution. Traditionally, only proprietary metadata models are provided for respective components. That is, traditionally, metadata models are provided for individual components, landscapes, tenants, and the like. Among other technical disadvantages and inefficiencies, this results in inability to scale the solution, as a whole, and requires disparate operations and management tools for respective layers of the solutions.

SUMMARY

Implementations of the present disclosure are directed to a metadata model, and usage thereof, for service-based applications deployed to cloud infrastructures. More particularly, implementations of the present disclosure are directed to a metadata model that includes a global model, a to-be model, and an as-is model respectively representing a software solution (also referred to herein as product and/or solution) and its constituent components, the metadata model being used to perform management, such as lifecycle management (LM), of the solution.

In some implementations, actions include defining a metadata model representative of the software solution, the metadata model including a global model, a to-be model, and an as-is model, the global model representing a high-level definition of the software solution including any optional components that can be included in the software solution at deployment for production use, the to-be model representing a variant of the software solution in relation to a deployment context, and the as-is model representing actual deployment of the software solution to one or more instances of the one or more cloud platforms, updating, by a first model updater, the global model to include metadata generated during execution of a release pipeline associated with the software solution, updating, by a second model updater, the to-be model to include metadata generated during execution of a deployment pipeline associated with the software solution, populating the as-is model with metadata generated as a result of deployment of the software solution to the one or more cloud platforms, the as-is model identifying versions of components of the software solution and respective deploy targets, to which the components are deployed to, and executing at least one management operation on the software solution at least partially based on the metadata model. Other implementations of this aspect include corresponding systems, apparatus, and computer programs, configured to perform the actions of the methods, encoded on computer storage devices.

These and other implementations can each optionally include one or more of the following features: the global model includes a set of global entities and the to-be model includes a set of to-be entities, a first sub-set of to-be entities inheriting properties entities in the set of global entities, and a second sub-set of to-be entities including properties specific to the to-be model; updating the global model includes receiving, by an update service of the first model updater, data from the release pipeline through a command line interface (CLI) of the first model updater, and executing at least one update operation on the global model in response to the data, the update service accessing the metadata model within a metadata model repository through a model plug-in; updating the to-be model includes receiving, by an update service of the second model updater, data from the deployment pipeline through a CLI of the second model updater, and executing at least one update operation on the to-be model in response to the data, the update service accessing the metadata model within a metadata model repository through a model plug-in; the metadata model represents the software solution as a tree of components using associations to provide recursiveness, the associations including a contains semantics association that establishes parent-child relationships between components and a uses semantics association that indicates whether components are included in the software solution or external to the software solution; actions further include providing a projection editor that accesses the metadata model from a metadata model repository and that provides one or more projection views to enable a user to edit an abstract syntax tree (AST) representation of at least a portion of the metadata model, the one or more projection views including one or more of a hierarchy view, a realm relationship view, an aspects view, a property reach view, a tree-difference view, a metadata-of-metadata view, and a value-help view; and the at least one management operation includes one of deployment, updating, patching, monitoring, and deleting.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
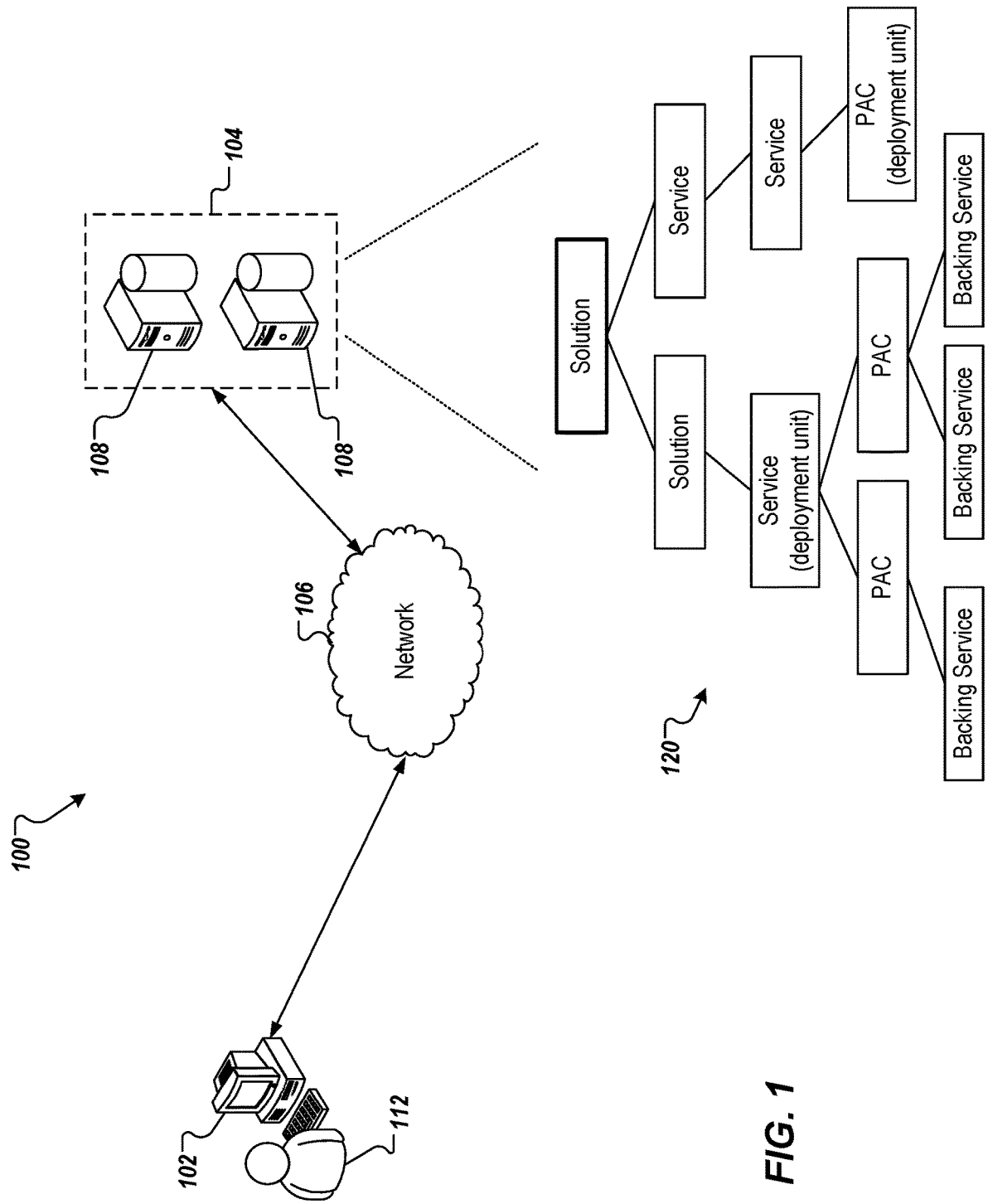
FIG. 1 depicts an example architecture that can be used to execute implementations of the present disclosure.

Implementations of the present disclosure are directed to a metadata model, and usage thereof, for service-based applications deployed to cloud infrastructures. More particularly, implementations of the present disclosure are directed to a metadata model that includes a global model, a to-be model, and an as-is model respectively representing a software solution (also referred to herein as product and/or solution) and its constituent components, the metadata model being used to perform management, such as lifecycle management (LM), of the solution. Implementations can include actions of defining a metadata model representative of the software solution, the metadata model including a global model, a to-be model, and an as-is model, the global model representing a high-level definition of the software solution including any optional components that can be included in the software solution at deployment for production use, the to-be model representing a variant of the software solution in relation to a deployment context, and the as-is model representing actual deployment of the software solution to one or more instances of the one or more cloud platforms, updating, by a first model updater, the global model to include metadata generated during execution of a release pipeline associated with the software solution, updating, by a second model updater, the to-be model to include metadata generated during execution of a deployment pipeline associated with the software solution, populating the as-is model with metadata generated as a result of deployment of the software solution to the one or more cloud platforms, the as-is model identifying versions of components of the software solution and respective deploy targets, to which the components are deployed to, and executing at least one management operation on the software solution at least partially based on the metadata model.

Implementations of the present disclosure are described in further detail herein with reference to example products and services provided by SAP SE of Walldorf, Germany. It is contemplated that implementations of the present disclosure can be realized with any appropriate products and/or services. An example cloud platform includes SAP Cloud Platform (SCP) provided by SAP SE. An example data repository includes the Product and Production Management System (PPMS) provided by SAP SE. The PPMS can be described as the central master data repository for technical information on SAP software components and software products. An example delivery channel can include the Repository-based shipment channel (RBSC) provided by SAP SE. The RBSC can be described as a fast-track software delivery channel that serves commercial software deliveries to customers, enabling customers to download software products from dedicated product repositories. Other products and services may be discussed herein without limitation to implementations of the present disclosure.

To provide further context for implementations of the present disclosure, and as introduced above, modern software solutions are provided as a set of services in so-called service-oriented architectures (SOAs). In general, a solution can be regarded as tree of components with arbitrary depth, where components can have multiple roles at once. For example, the solution itself can be a service (e.g., providing functionality for a higher-level service or solution), a service can be considered a deployment unit, and a deployment unit can be a platform atomic component (PAC) that is deployed to a particular infrastructure for execution.

Software solutions are deployed in multiple disparate patterns. An example pattern can include a solution being built on a single stack, but uses services from other stacks and content in multiple stacks. For example, a solution can include an Internet-of-Things (IoT) application that is instantiated in Cloud Foundry (CF), but uses a data management suite executing within Kubernetes (K8S). Another example pattern can include a service provided as a bundle (e.g., of sub-services (micro-services)) that spans multiple stacks (e.g., a data management suite composed of micro-services that are instantiated across multiple stacks). Another example pattern is solutions having content that spans multiple stacks. Still another example pattern is solutions with code spanning multiple stacks.

To provide further context, an anatomy of a solution can be considered. For example, a solution can be described as a set of services that provides coherent functionality offered to customers as a single entity. A service can be described as functionality that is developed by the developer of the solution. In some examples, a service can be provided as a group of micro-services or services offered as one piece of functionality within the solution. A service may be offered as standalone and, as such, can itself be considered a solution.

A platform can be described as a coherent execution environment for execution of services and/or provisioning of content consumed by the solution. In the context of the present disclosure, platforms include cloud-based platforms that execute cloud-native solutions. Example platforms can include CF and K8S. PACs are entities within a platform that manage execution of services. An example PAC in K8S can include a pod, and an example PAC in CF can include a CF application. A micro-service can be described as a special PAC that actually executes code (e.g., a K8S deployment, a CF application including backing services, content). A deployment unit can be described as any service or PAC that can be the unit of deployment from the solution perspective. It cannot be partitioned any further from a deployment perspective. It typically results in multiple PACs when being deployed. A landscape can be described as a single deployment of a platform. Example landscapes can include a CF landscape, a K8S cluster, a set of K8S clusters. In short, a landscape is the entity to which a solution is deployed to (i.e., deployment units of the solution are deployed to.

A backing service can be described as any functionality that is not developed by the developer of the solution and is consumed by the service as reference. That is, development and deployment of backing services is not within the responsibility of the solution, which only consumes the backing services. In some examples, a backing service can be provided as a platform backing service or an external backing service. A platform backing service is a backing service that is provided within a platform managed by the developer of the solution (e.g., SCP). An external backing service is a backing service that is provided within a platform that is not managed by the developer of the solution.

A tenant can be described as a sub-account within a cloud platform. For example, multiple customers can use the solution, each customer being a respective tenant within the cloud platform. Tenants can be defined within a cloud platform as, for example, a CF organization, a K8S namespace, and a K8S cluster. A private tenant can be considered a tenant, for which the solution (or services within the solution) may offer additional data and execution isolation. For example, different versions of services can be deployed to private tenants, while other tenants use the same version.

Software solutions are to be managed, which entails a whole host of processes and activities. These can include, for example, provisioning, updating, patching, LM, removal, monitoring and alerting, root cause analysis (RCA), among numerous others. For example, provisioning can include the initial deployment and configuration of a solution in landscapes or tenants. mass operation. Updating can be described as recurring deployment and configuration of a new solution version and/or, depending on the update scheme, new versions of individual solution components into existing landscapes and/or tenants. Updating can provide new functionality and features which might also imply the addition and/or removal of solution components and/or backing services. Patching can be used between updates to make corrections (e.g., security patches), but typically does not introduce new functionality. LM provides an overview of the solutions, tenants, solution components, landscapes, and the like, as well as the dependencies therebetween. LM can be implemented as the core of a configuration management database (CMDB). Removal can include decommissioning and deletion of tenants, solutions, or even landscapes. Monitoring and alerting can include retrieval of metrics describing the behavior of the solution, backing services, and the underlying platform. Metrics are evaluated against thresholds and, in response to exceeding thresholds, for example, alerts are created and brought to the intention of the administrators. RCA, which can be considered as part of incident management and/or problem management, can be described as the process of determining the cause of a problem (manifested through alerts, incidents) based on traces, logs and metrics from the various layers (i.e., solution, platform, infrastructure, network). Other processes/activities of managing a solution can include user management, access management, security management, back-up and restore, among various others.

However, in terms of managing solutions, such as for LM, the expectation is that a solution is managed as a whole instead of management of individual components, tenants, or portions of landscapes. To achieve this, a solution needs to be defined as a whole with all of its constituent components and dependencies therebetween across all layers of the solution. Traditionally, only proprietary metadata models are provided for respective components. Among other technical disadvantages and inefficiencies, this results in inability to scale the solution, as a whole, and requires disparate operations and LM tools for respective components of the solutions. In short, traditional solutions, particularly cloud-native solutions, are absent a standardized metadata model for managing cloud-based, service-oriented solutions that enables management of a solution as a whole.

In view of the above context, implementations of the present disclosure provide a metadata model, and usage thereof, for cloud-native, service-based applications deployed to cloud infrastructures. As described in further detail herein, the metadata model of the present disclosure, referred to as the cloud component model (CCM), is absent an explicitly introduced component type that names or represents a solution. Instead, the CCM assumes only one or multiple components serving as root of a tree (or directed network) of components, from which a management tool, for example, can discover the components and operate on one or more components according to the metadata. In some examples, a component can include a contained component or be a service that is used by another component. The role given to a component is typically a matter of viewpoint and there is no inherent property of the component. This is in contrast to a software architecture that exhibits which components and which of their relationships (that define the components closure) have been defined and implemented. These are facts that cannot be changed without implementation change in contrast to other human-defined projections on this structure. LM is ultimately about managing these facts.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can represent one or more landscapes and/or tenants, to which a solution is deployed. A metadata model 120 for the solution is provided, which enables the solution to be managed as a whole. That is, for example, management processes/activities can be executed using one or more management tools on the solution through use of the metadata model. For example, the user 112 can be an administrator that interact with a management tool (e.g., computer-executable software) using the client device 102 to perform management activities on the solution (e.g., update, patch, user management). As depicted in FIG. 1, and as described in further detail herein, the metadata model 120 represents the software solution as a tree of components using associations to provide recursiveness. In some examples, the associations include a contains semantics association that establishes parent-child relationships between components and a uses semantics association that indicates whether components are included in the software solution or external to the software solution.

Figure 2A:
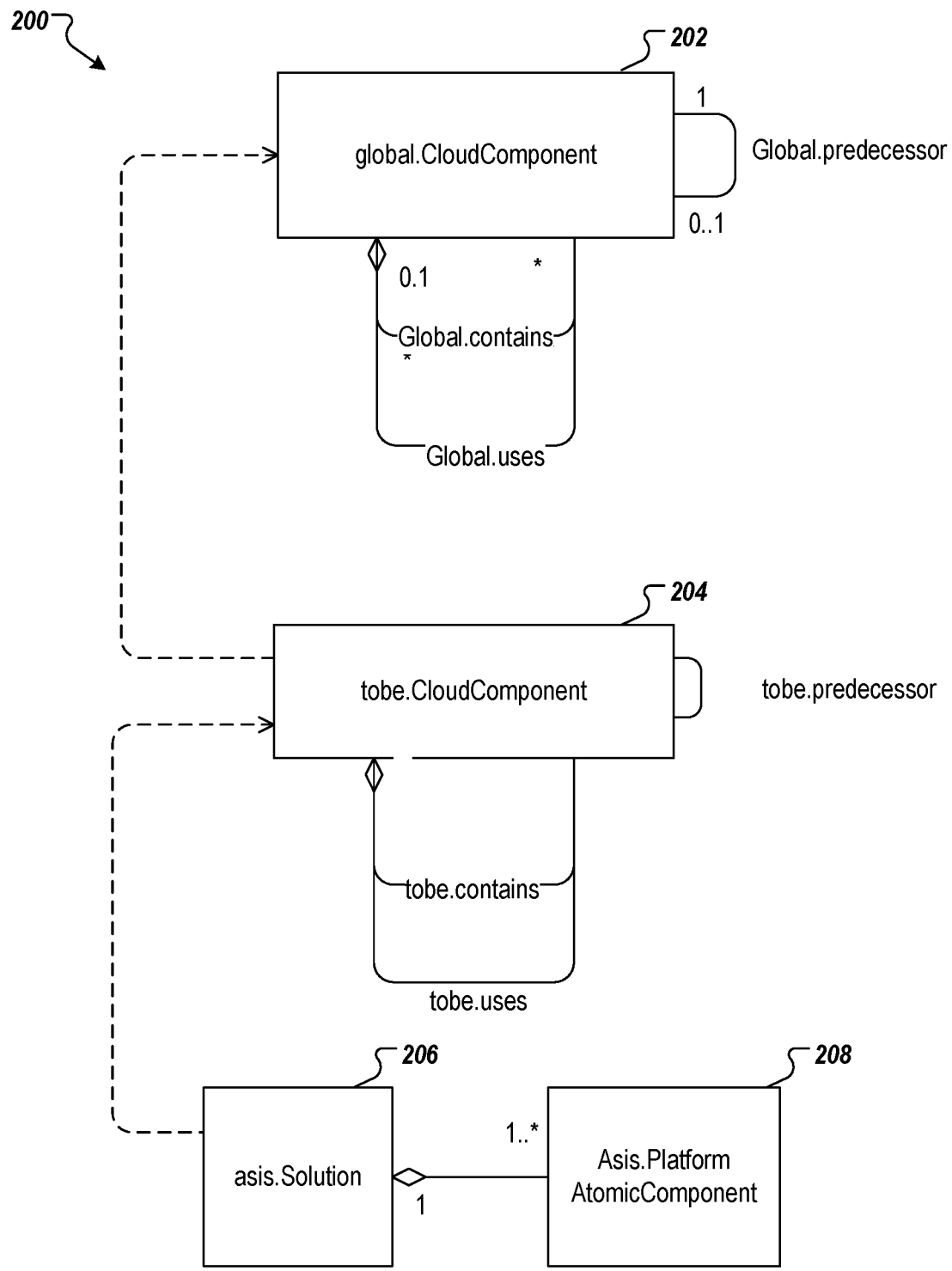
FIGS. 2A-2E depict representations of a metadata model in accordance with implementations of the present disclosure.

FIGS. 2A-2E depict representations of a metadata model 200 in accordance with implementations of the present disclosure. That is, the metadata model 200 of FIGS. 2A-2D is the CCM of the present disclosure. FIG. 2A depicts a high-level representation of the metadata model 200, while FIGS. 2B-2E depict further detail of the metadata model 200. In some implementations, the metadata model 200 can be provided in one of multiple model formats. Example model formats include database (DB), hierarchical file, and flat file.

With particular reference to FIG. 2A, the metadata model 200 includes a global model 202 (global.CloudComponent), a to-be model 204 (tobe.CloudComponent), and an as-is model 206 (asis.Solution) with respective platform atomic components (PACs) 208 (Asis.PlatformAtomicComponent). The global model 202 is a model of what can be released to production and can be described as a solution definition including all optional components (i.e., the overall solution or product definition). The to-be model 204 models a specific solution variant attached to specific deployment contexts (e.g., test, staging landscapes, clusters, systems). In some examples, the to-be model 204 serves as the bills of material (BOM) input for deploy pipelines and tools. In other words, each to-be model 204 represents a solution variant for a particular deploy context (e.g. by documenting the decision on solution options), and documents the deploy targets the solution is to be deployed to. The as-is model 206 represents the actual deployment in one or more platform instances at which the solutions are deployed. For K8S and CF, this can be implemented as labels attached to the different PACs (e.g., CF application, K8S deployment) and added to the components. During deployment, the as-is model 206 documents which solution (version) has been deployed to which deploy targets and makes this information discoverable. The PACs created during the deployment are unambiguously correlated to the solution they belong to in the as-is model 206.

In some examples, different implementations strategies are available for the metadata model. For example, in modeling, a partial versioning strategy or a full versioning strategy can be used. The partial versioning strategy provides that only lower layers of the metadata model are versioned, while upper levels are only types and represent the structure of the solution. The full versioning strategy provides that all layers of the metadata model are versioned (e.g., except dependent components). As another example, in build, a pipeline configuration strategy or a pipeline output strategy can be used. The pipeline configuration strategy provides that a global model is input for the build pipelines. The pipeline output strategy provides that a global model is updated after the build. As another example, in release, a central assembly strategy or a decentral assembly strategy can be used. The central assembly strategy provides that the solution components and versions are determined centrally at one point in time by putting the model together from, for example, the latest, released/production-ready components. The decentral assembly strategy provides that the solution components update individually the entire solution metadata and thus multiple parallel solution metadata release candidates exist. Depending on the deployment strategy, some of the release candidates must be merged.

Example deployment strategies include a parallel deployment strategy and a synchronized deployment strategy. The parallel deployment strategy includes deployment of components whenever they are ready, but can only be used with the partial versioning strategy. The synchronized deployment strategy provides only one deployment of one version of the solution (regardless of how many components have changed). As another example, in deployment evidence, an explicit platform tagging strategy, an implicit platform tagging strategy, or a platform-independent strategy can be used. The explicit platform tagging strategy includes tagging all platform atomic components that make up the solution. The implicit platform tagging strategy includes persisting only the solution type and version in the platform, the platform atomic components can be discovered by assuming that all platform atomic components residing in a partition of the platform (K8S namespace, CF space) belong completely to the solution. The platform-independent strategy provides a copy of the to-be model with potentially adjusted deploy targets (exhibiting only the deploy target, for which the deployment was actually carried out, and excluding deploy targets that have not been updated or update had been aborted due to errors).

As described herein, the metadata model of the present disclosure is not meant to be a full definition of how to deploy a solution. This is because standards already exist for deployment and, as such, need not be duplicated. Further, the standards are largely technology/platform dependent. Instead, the metadata model of the present disclosure provides self-contained metadata that represents an entire solution and can be leveraged for solution management operations (e.g., LM). As described in further detail herein, the metadata model provides a hierarchical structure from solution down to platform atomic components. The metadata model of the present disclosure provides flexibility to express many different solutions. That is, the metadata model describes what is developed rather than imposing a structure of what is to be developed. The metadata model includes a relatively small set of predefined component and association types with semantics that are determined by using or omitting properties as the properties fit. This enables creation of both shallow and deep hierarchies of components for simple and complex solutions, for example. With regard to structure, the metadata model provides minimal assumptions about cardinalities between the solution components and includes explicit associations between components in order to add properties to these relationships. This enables adding new association types, ease to discover and check the structure programmatically. The metadata model also provides simplified extensibility by adding namespaced properties for special purpose semantics.

With regard to hierarchical property reach, any properties defined at one node of the hierarchical, recursive model structure is valid for all children of that node. Any program reading and applying the property must traverse the tree in order to understand the full reach of the property. This avoids the repetition of metadata and provides a strong measure for simple modeling of complex software. If the property is repeated with the same value, it is either a means of self-containment of the respective entity or an explicit entity-local decision or, if the value is different, a value to define exceptions of one the parents up in the tree.

At a minimum, the metadata model represents a single cloud component (CC). Typically, however, the metadata model will represent multiple layers of CCs (e.g., three to four layers). The topmost layer is the solution layer, which includes a CC instance that represents the solution and is the entry point to the metadata model. In some examples, a service layer is provided, but is empty. In some examples, a package layer is provided and includes a CC instance for each component representing a deployable package. In some examples, a PAC layer can be provided, which represents PACs (e.g., Kubernetes pod, CF application). In some examples, a dependency layer is provided to represent any dependencies between CCs.

Figure 2B:
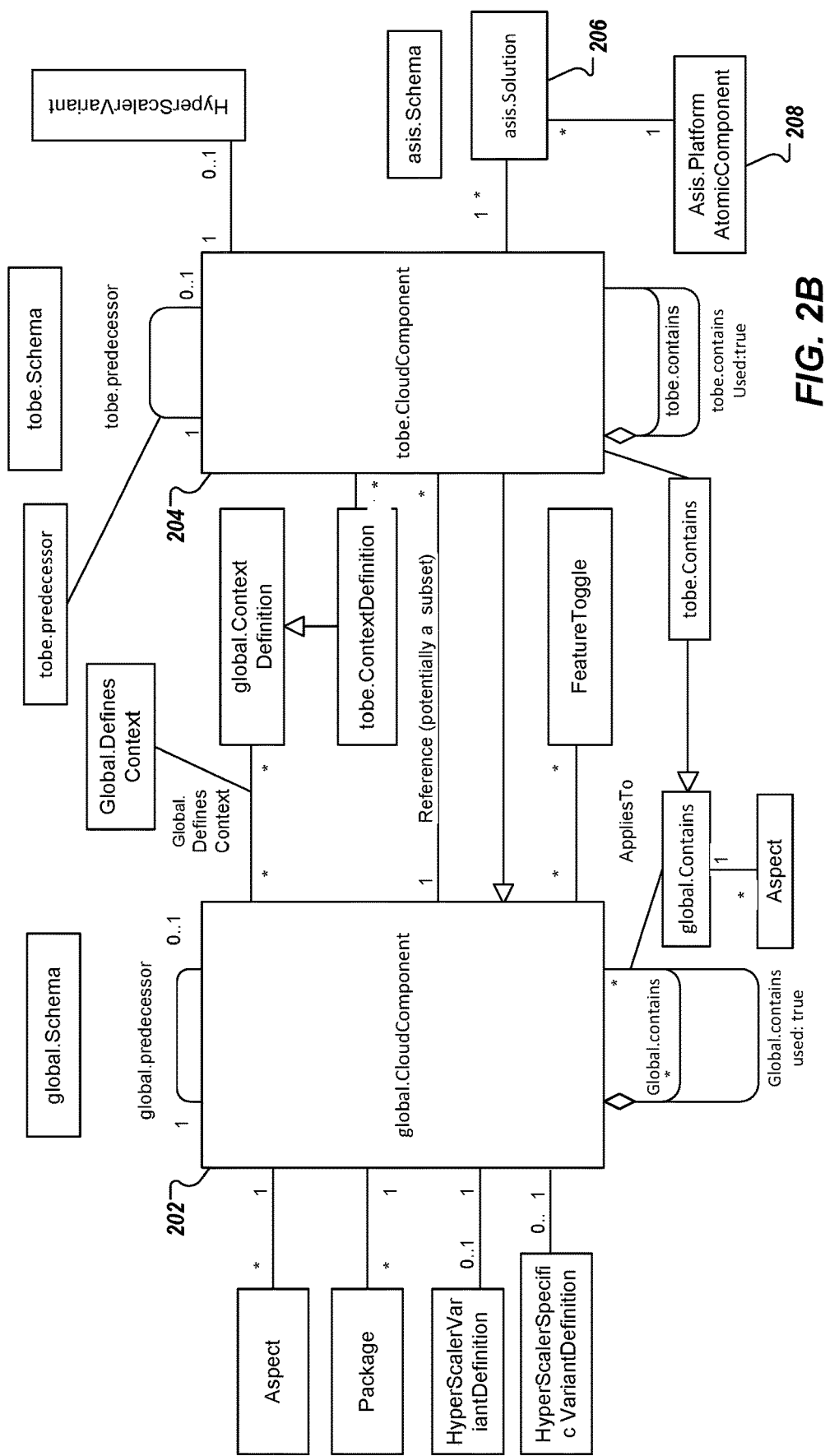

FIG. 2B depicts a class diagram describing basic entities of the metadata model including classes, objects, and associations. In the example of FIG. 2B, the global model 202 (global.CloudComponent), the to-be model 204 (tobe.CloudComponent), the as-is model 206 (asis.Solution), and the PACs 208 (Asis.PlatformAtomicComponent) are classes with versions and IDs. To-be entities inherit from global entities. This means that they inherit all properties (name/value pairs, lists, associations) and provide additional properties that are used to document the various parameter values and decisions being taken from the could-be solutions space described by the global model 202 to the desired state solution space described by the to-be model 204.

In some examples, aspect, hyperscaler variants, and packages are objects to the CCs and are, thus, embedded to the classes. They cannot have associations to other entities and are details to the class they are embedded in. Global.Contains, tobe.contains, global.predecessor, tobe.predecessor are associations and are, thus, explicit in the models (and not implicit by lists of objects inside of the classes). Because these are explicit model entities, they can also have properties. For example, tobe.contains inherits all properties from global.contains and provides to-be-specific properties.

Figure 2C:
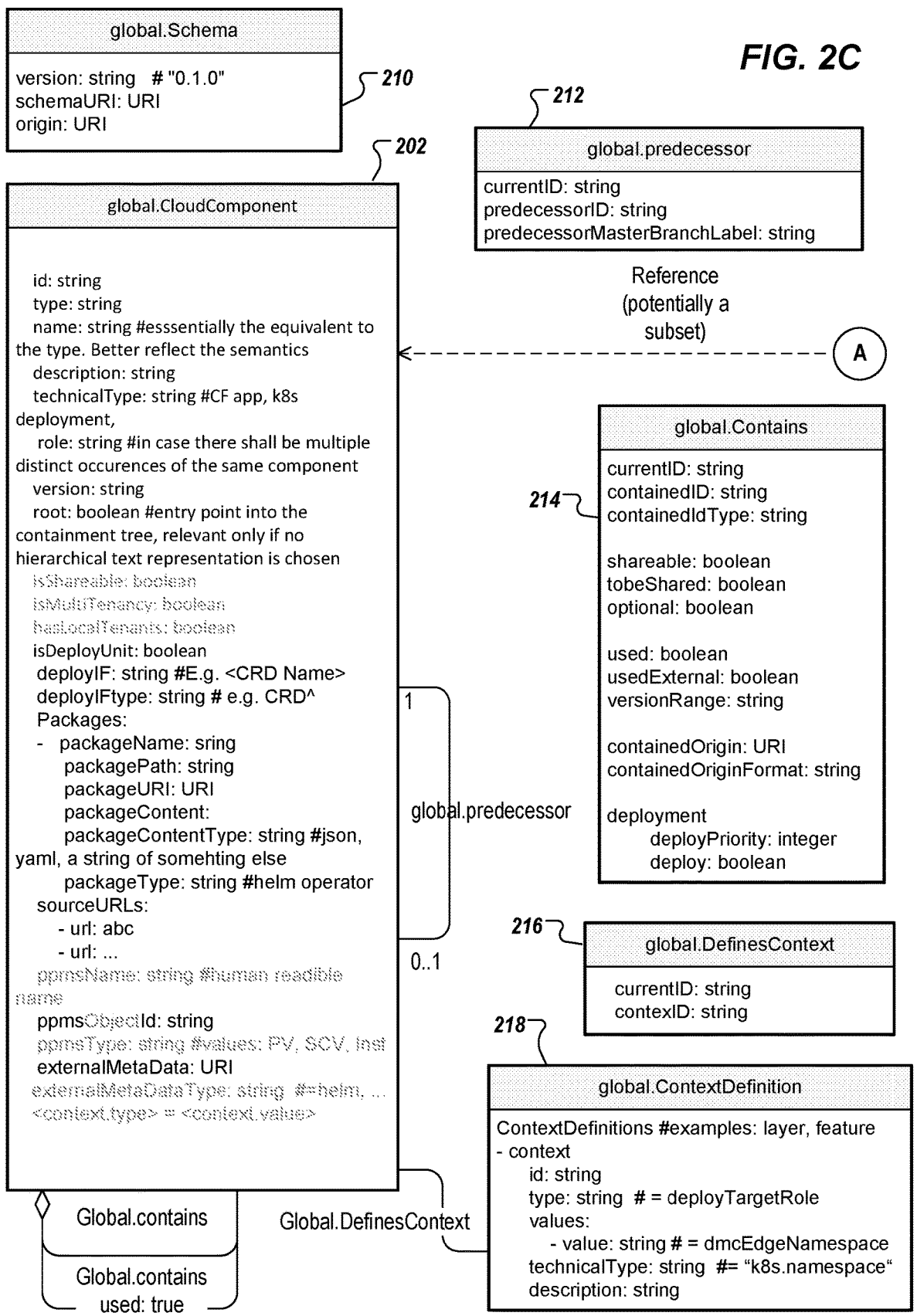
Figure 2D:
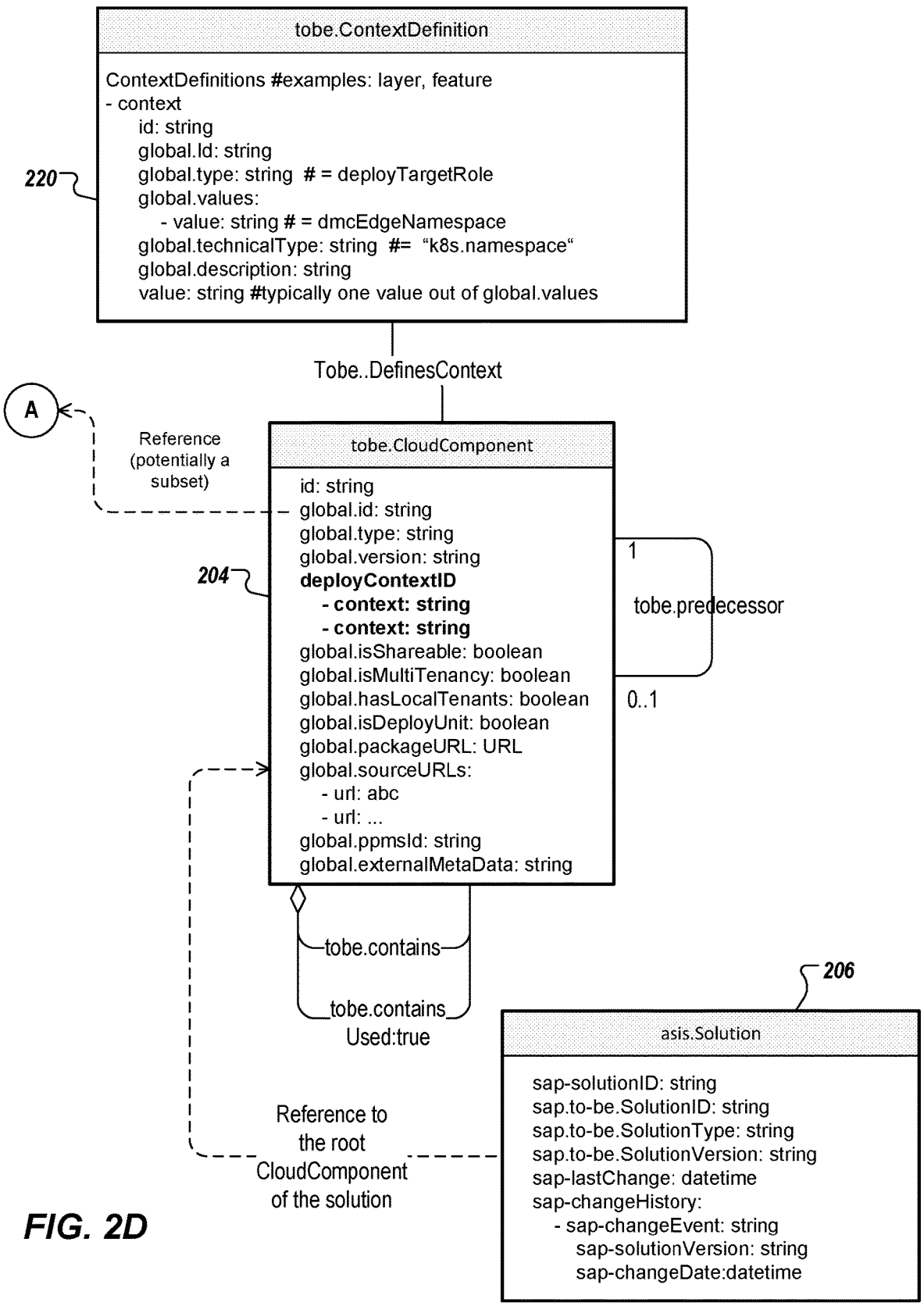

As depicted in FIGS. 2A-2E, CloudComponent is the principal model entity. Details of properties of the respective cloud components (i.e., the global model 202 (global.CloudComponent), the to-be model 204 (tobe.CloudComponent)) are depicted in FIGS. 2C and 2D.

With regard to properties of global.CloudComponent, these represent entities (e.g., solutions, services). For example, id is a string number key (#key) that can be provided as a combination of version and type in order to make it globally unique. This enables database and file persistency without collision. In some examples, type is a string number version (#version) that is independent of the name of the component. This carries the solution-specific semantics of the cloud component independent of the underlying structure and versions. In some examples, description is a string including technical type (e.g., string #CF application, Kubernetes deployment). In some examples, role is a string number in case there are multiple distinct occurrences of the same component in a solution. In some examples, version is a string number as a version identifier.

As noted above, tobe.CloudComponent inherits the properties from the global. CloudComponent. Besides the inherited properties, additional properties of the tobe.CloudComponent include id (string) and a set of deployContextIDs (e.g., a list of strings).

The metadata model of the present disclosure also represents versioning of solutions. For example, a standardized version scheme can be followed and a predecessor association enables version-based relationships to be made explicit. In some examples, CloudComponent instances without version indicate a structure node for which only name/type and/or role (i.e., the identification over space) are relevant and version information is irrelevant. This is typically true for used components (=proxy components, associated through uses).

A schema object (global.Schema) 210 (FIG. 2C) is provided. The schema object 210 ensures that the model definition is known and models must be prepared for evolution. Properties of the schema object 210 include version, schemaURI (uniform resource indicator (URI)), and origin.

A global.Predecessor 212 (FIG. 2C) is an object that links two cloud components of the same type, but of different versions. In this manner, the global.predecessor 212 enable determination of the sequence of the versions. For example, update checks need to determine whether the to-be-updated version is really the predecessor version and compare two versions in order to avoid upgrade inconsistencies. For example, even with major.minor.patch version schemes it is not possible to understand that 2.0.0 is the successor to 1.1.12. The global.Predecessor 212 includes properties of predecessorID (the previous version of the cloud component), currentID (the current version of the cloud component, starting point of the association), and predecessorMasterBranchLabel. If the persistency is a file that is versioned with a version control system (VCS), the predecessor then actually resides in a previous version of the same file which can only be found by a label in the VCS.

Solutions are compositions of components. However, lists or fixed-depth trees of components are not sufficient. Therefore, the metadata model of the present disclosure provides recursiveness through use of associations. In some examples, the association "contains" is used with a flag "uses" in two different manners to provide two associations. For example:

```
CloudComponent
    id: t
    Contains
        # uses semantics
        - uses: true
            #... uses properties
            #...
            CloudComponent
                id: 1
        - uses: true
            #... uses properties
            #...
            CloudComponent
                id: 2
        - #...
        #true contains semantics
            # implicit: uses = false, since the default of uses
    is false
            #... contains properties
            # ...
        - CloudComponent
```

-continued

```
        id: a
     #... properties
     # ...
   - CloudComponent
        id: b
   - #....
```

Listing 1: Example Associations Between Cloud Components

Here, contains semantics is an association that expresses that component t is the parent component to components a and b. It means that the child components participate in the same lifecycle of component t as the parent. This implies that contained components have a strong mutual context like the same product, same solution, and the like. More particularly, the solution t consists of a and b. The deployment of t means that a and b are to be deployed (=participation in the same lifecycle). Uses semantics is an association that expresses that component 1 and 2 are only used (e.g., external or backing service) and not deployed or managed in its lifecycle of component t, which uses them. This association is used by the LM tools to visualize the dependencies for ensuring consistency and transparency of the entire solution structure since dependencies are typically not easily or not at all visible in the runtime system.

Accordingly, the metadata model 200 includes a contains object (global.Contains) 214 (FIG. 2C). Properties of the contains object 214 can include currentID (the cloud component that is the container), associatedID (the cloud component that is contained (associated)), associatedIdType (id type, role; id is default if null or omitted), containedOrigin (URI for any entity in another file or DB), and containedOriginFormat: (filename). In cases where no hierarchical representation is chosen, the entries to the subnet can be tagged.

To express usage dependencies, other properties of the contains object 214 can include used (contained cloud component is only used (e.g. external or backing service) and not deployed or managed in its lifecycle by the solution) and usedExternal (contained cloud component is external to the platform/environment in which the cloud component is executed). The reason for this is that dependencies are to be used by the LM tools to visualize the dependencies for ensuring consistency and transparency of the entire solution structure since dependencies are typically not easily or not at all visible in the runtime system. Another property includes versionRange (use: >, >=, <=, <,—with version from semver.org, for example, otherwise use a list). This property enables expression of constraints under which the solution can be instantiated (deployed or provisioned). For example, usage of components can depend on the version of the used component. If version constraints are known already at design time, the version constraints have to be specified in order to avoid faulty solution instances due to non-matching backing services.

Figure 2E:
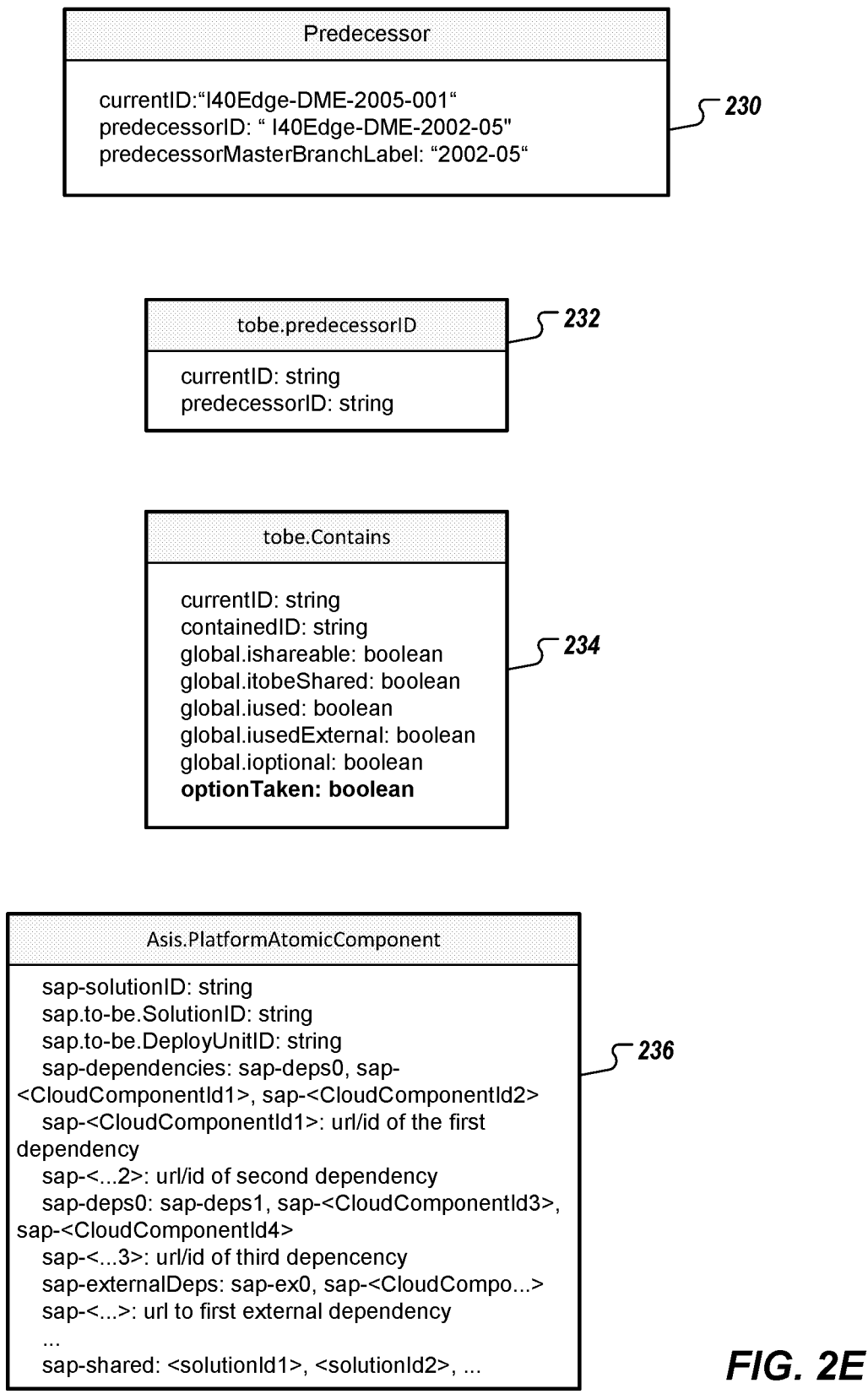

The metadata model 200 also includes a defines context association class (global.DefinesContext) 216 and a context definition object (global. ContextDefinition) 218 (FIG. 2C). The context definition object 218 is associated with the global model (global.CloudComponent) 202 through the defines context object 216 with reference to currentID. Similarly, the metadata model 200 includes a context definition object (tobe.ContextDefinition) 220 (FIG. 2D). In this manner, the to-be model 204 exhibits the corresponding entity enhanced by the actual value defining the context that is applied in the particular deployment. More particularly, a Tobe.DefinesContext is an association class that links the tobe.ContextDefintion 220 to a corresponding tobe.CloudComponent 204. Other objects include a predecessor object 230, a to-be predecessor identifier (tobe.predecessorID) object 232, a to-be container (tobe.Contains) object 234, and an as-is PAC (Asis.PlatformAtomicComponent) object 236 (FIG. 2E).

Figure 3:
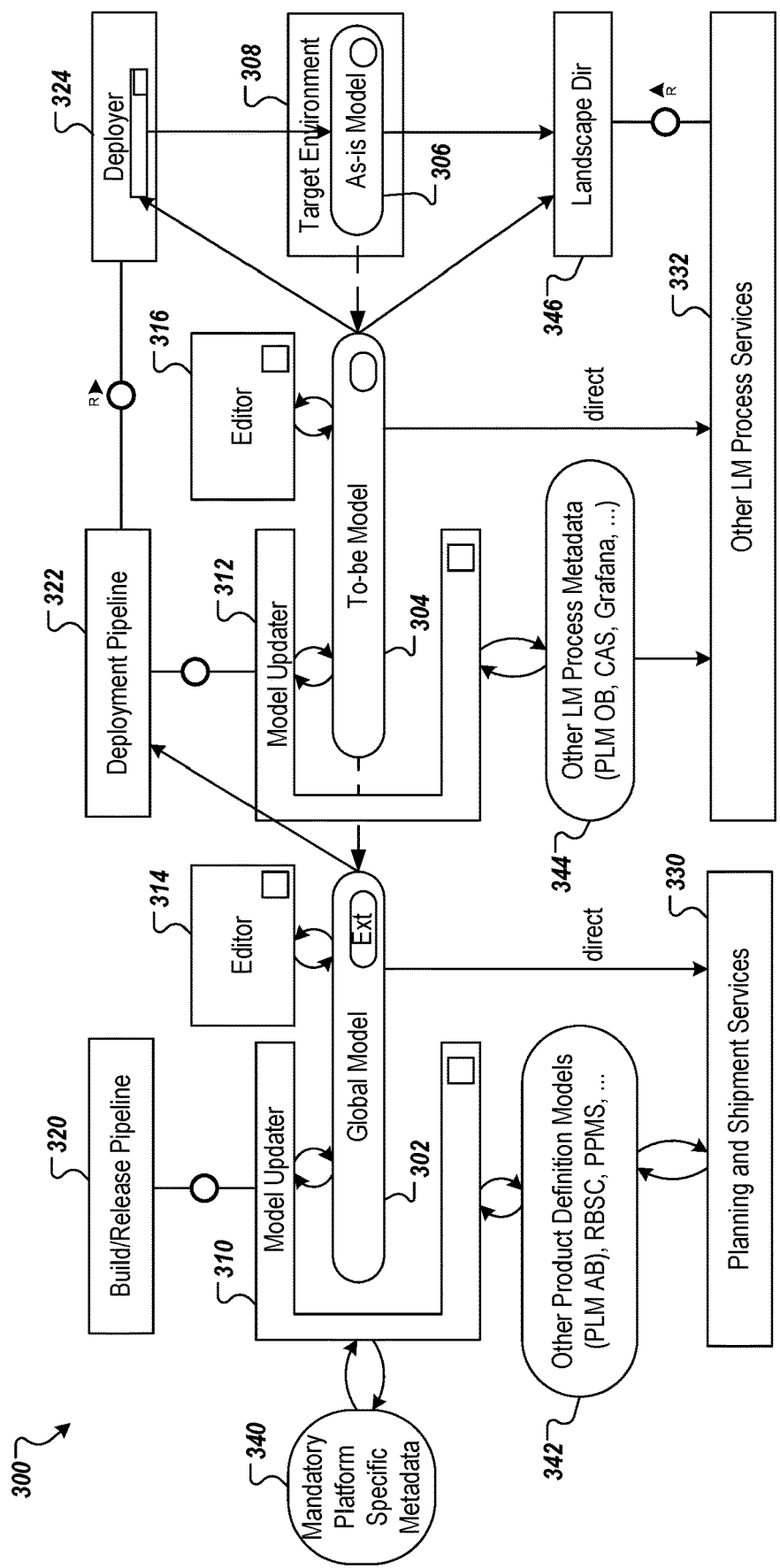
FIG. 3 depicts an example architecture representing use of the metadata model in accordance with implementations of the present disclosure.

FIG. 3 depicts an example architecture 300 representing use of the metadata model (the CCM) in accordance with implementations of the present disclosure. In the example of FIG. 3, the example architecture 300 includes a global model 302, a to-be model 304, and an as-is model 306, which is provided within a target environment 308. The example architecture 300 further includes a model updater 310, a model updater 312, an editor 314, an editor 316, a development (build/release) pipeline 320, a deployment pipeline 322, a deployer 324, planning and shipment services 330, and general LM services 332. The example architecture 300 further includes mandatory platform-specific metadata 340, product definition models 340, LM process metadata 344, and a landscape directory 346.

In some examples, each model updater 310, 312 is provided as command line tools (command line interface (CLI)) that are executable to synchronize the global model 302, the to-be model 304, and the as-is model 306. Technically, synchronization includes executing create, read, update, and/or delete (CRUD) operations to specified parts of a model file (or DB) including, for example, trees, occurrences of patterns in a tree, dedicated entities or properties (e.g., typically expressed with xpath), update (overwrite), CU (CLI parameters=path to model part, new model data), RD (CLI parameters=path to model part). Synchronization also includes detecting model deltas (parts or entirety). This can include, for example, diffing (comparing) to determine updates that have been executed, or art to be executed, and consistency checking (e.g., that no updates have occurred). Synchronization can further include CRUD operations for one data source/model type, at least read for another data source/model type. For example, CRUD for CloudComponent file and read for PPMS model to keep PPMS (as source) in synchronization with a CloudComponent model.

In some examples, the editors 314, 316 (although two are depicted, the editors 314, 316 can be provided as a single editor) is used to create the CloudComponent models and benefits from different, adequate and thus simplified perspectives on the same file. This can include, for example, editing the component hierarchy, all other properties except name and version may be neglectable, and providing a representation in a tree format. In some examples, the editors 314, 316 are each provided as projection editors, which are an efficient and resource-inexpensive means to define specific editable views on the same data source. Use of projection editors obviate the need to create editors from scratch, that hide the non-required clutter and present editable data in a specific form, which is time- and resource-inefficient. An example projection editor is JetBeans, which is an open-source projection editor that enables definition of dedicated editors without having to program them (e.g., in contrast to Eclipse xText).

With continued reference to FIG. 3, the development (build/release) pipeline 320 represents development of a solution represented in the metadata model. It is this development process that results in the global model 302 representing the solution. The deployment pipeline 322 represents expected deployment of the solution to the target environment 308. This deployment planning process results in the to-be model 304. The deployer 324 actually deploys the solution to the target environment 308, which deployment results in the as-is model 306. In some examples, planning and shipment services 330 are services provided by the software vendor for shipment of the solution to a customer. In some examples, general LM services 332 are services that are provisioned for LM of the deployed solution.

Figure 4:
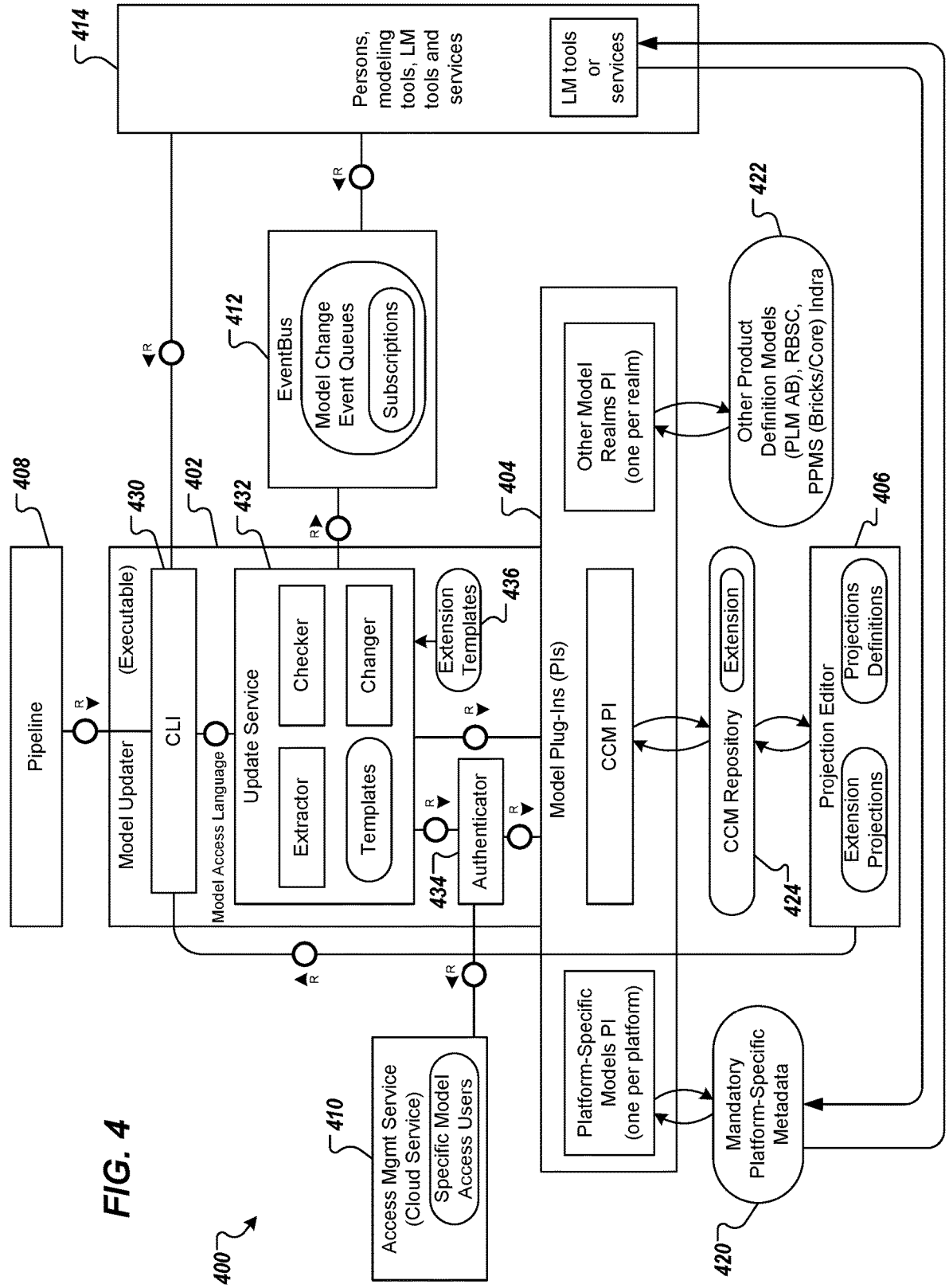
FIG. 4 depicts an example architecture representing metadata model updating component in accordance with implementations of the present disclosure.

FIG. 4 depicts an example architecture 400 representing metadata model updating in accordance with implementations of the present disclosure. In the example of FIG. 4, the example architecture 400 includes a model updater 402 (e.g., one of the model updaters 310, 312 of FIG. 3), model plug-ins 404, an editor 406, a pipeline 408 (e.g., one of the development pipeline 320 and the deployment pipeline 322 of FIG. 3), an access management service 410, an event bus 412, and a tools system 414. The example architecture 400 further includes metadata 420, one or more product definition models 422, and a metadata model repository 424 (CCM repository).

In some examples, the model updater 402 is provided an executable that can be run in an operating system (OS). That is, the model updater 402 need not itself be provided as a cloud service per se. The model updater 402 includes a CLI 430, an update service 432, an authenticator 434, and extension templates 436. The CLI 430 is integrated into the model updater 402, such that the CLI 430 can be invoked from pipeline scripts (step implementation). In some examples, the update service 432 includes an API (e.g., a HTTP API) that can be used to provide remote access. In some examples, the projection editor 406 can also use of the CLI 430 to interact with the model updater 402.

In some examples, a command of the CLI makes use of a model-independent access language (model access language/MAL) and is handed over to the update service 432. The update service 432 dissembles the command into a sequence of steps using MAL statements. In some examples, each step is a primitive in set of primitives. In some examples, the set of primitives includes metadata extraction, metadata check (comparison), and metadata change. In the example of FIG. 4, the primitives are implemented in correspondingly named modules (e.g., extractor, checker, changer). The update service 432 also provides templates (e.g., both built-in templates), which, in hand with the extension templates 436, which enable the reuse of MAL snippets as well as entire parts of model entities. The latter helps to generate new models or parts thereof in a most automated and repeatable manner.

In some examples, the CLI 430 exposes multiple commands. Example commands include check (check metadata model consistency) and update (update metadata model). For example:
  Check -sourceLocation -stype -sVersionPattern -spathPattern -targetLocation -ttype -tVersionPattern -tpathPattern -recursive -template
which provides the following example output:
  Result sourceRPath/name=value targetRPath/name=value diff
As another example:
  Update -source -stype -target -ttype -spathPattern -tpathPattern -recursive -create -template -simulate
which provides the following example output:
  Op result sourcePath/value targetPath previous value, new value where op is one of change, add, and delete. Here, simulate runs the update without executing the update, but produces the output as if the update were actually executed. If simulation is commanded, <filename> produces a copy of the file to be checked. In some examples, create also includes deletion. In some examples, template enables selection of predefined actions in which some of the parameters are already pre-defined.

Further commands of the CLI 430 can be provided to, for example, transform a metadata model to other representations. This can include, for example, creating platform-specific metadata (e.g., a Helm chart), creating BOMs for the repository-based shipment channel, or other tool- or task-specific BOM formats. The following example advanced model transformation options can be provided: split and merge objects and sub-trees into separate files; merge a new global model version into an existing to-be version in order to reflect the new to-be state with a new solution version; and branch flattening along siblings (the result would be flat lists while omitting intermediate nodes of the tree).

In some implementations, the MAL has multiple patterns. Example patterns include version pattern and path pattern. For example, the version pattern can be provided as:
  <current ID of the cloud component> <path to desired predecessor association>
The path pattern enables change model entities (objects and properties of objects) to be identified within a hierarchical model. The structure of the path pattern can be provided as:
  / . . . /<namePattern>=<valuePattern>[, < >=< >]
  /< >/ . . . /<namePattern>=<valuePattern>
In some examples, namePattern and valuePattern are regular expressions that are used to identify properties of the hierarchical model. There can be as many of the patterns in the path as desired. The ellipsis ( . . . ) each indicate that the preceding patterns are searched for at all child levels of the model tree hierarchy until the next pattern is found.

A result path (rPath) is a result of applying the path pattern in a search, and can be provided as:
  rPath=/<objectname>/<objIDName>=<objIDVal>/<assocName>/ . . . /<Name>=<value>
Here, the ellipsis ( . . . ) indicates that, depending on the depth of the resulting path, further object names and association names follow prior to the leave of this expanded search tree, which is the desired search result of the path pattern.

In some implementations, the metadata models (CCMs) reside in the metadata repository 424 and not locally in the file system of the OS, in which the model updater 402 is executed. In order to gain access to the metadata model repository 424, credentials can be issued. In some examples, the credentials are fetched by the authenticator 434 of the model updater 402 from the access management service 410. The access management service 410 can be provided as a cloud service that can serve multiple instances of the model updater 402. The authenticator 434 initiates a connection to the metadata model repository 424 (or a check-out of a respective metadata model from the metadata model repository 424) as specified in the command input to the CLI 420. The actual task of authentication and connection creation (or file check-out) is carried out by respective model plug-ins 404. The model plug-ins 404 are implementations for access to specific metadata models and technical metadata model formats. For example, a built-in plug-in is for a YAML-based CCM files. Other examples include Helm charts (e.g., in a git repository, file system, chart repository), PPMS model data, and the like.

After gaining access to the metadata model, the update service 432 executes the sequence of primitives through the corresponding plug-ins (the model type and thus the required plug-in is specified in the command). The plug-in executes the MAL statement that is received from the respective primitive modules (e.g., extractor, checker, changer) of the update service 432. For this purpose, the plug-in translates the MAL statement to model-specific commands and applies the commands. For example, the plug-in searches the specified metadata, returns the found and desired metadata or changes the found and desired metadata.

In some examples, the update service 432 translates results of the metadata access (primarily changes, but also checks and comparisons) to change events that are emitted to the event bus 412. A set of queues is provided in the event bus 412 as part of the overall environment configuration that also includes the creation of model access user credentials in the access management service 410. These metadata change events can be consumed by any tools in the tools system 414, which can trigger further activities on other models or trigger services and tools using the new model version announced by this change event.

In some examples, the update service 432 creates two instances of an extractor: one for the source (s) and one for the target (t). These outputs of these instances are used for the inputs of the extractor, checker and changer primitives within the update service 432. For example:

sExt.output=tExt.input→tExt.output=existence, actual values, non-existence
Checker.input=tExt.output+sExt.output
Checker.input=s.CLI description
Changer. Input=tExt.output+sExt.output
Changer.Output=s.CLI description In accordance with implementations of the present disclosure, the model updater 402 is operable in multiple scenarios. Example scenarios include, external metadata extraction, metadata change operations, metadata consistency check operations, external metadata creation operations, pipeline configuration input, and input for release quality reporting. For example, and with regard to external metadata extraction, metadata can be extracted from platform-specific representations to enable creation of additional grouping components. For example, a Helm chart can describe multiple software products of the PPMS that cannot be modeled together with automatically extracting metadata from the Helm chart. In some examples, metadata change operations can be executed to, for example: update PPMS numbers uniformly across a metadata model, update IDs across files, update version numbers (e.g., create a next version), and change the URLs of the packages from milestone to value to production repositories. In some examples, metadata consistency check operations can be executed to, for example: check IDs, types, versions with use relationships in other files (input: file location of solution.yml against which the check is to be performed). In some examples, external metadata creation operations can include, for example: generation of RBSC BOMs, creation of tags in platform-specific metadata that later create the as-is labels at runtime, and monitoring configurations. In some examples, external metadata creation operations can be coupled with templates such that specific property values (e.g., pointing to a specific pattern) can be used. In some examples, pipeline configuration input enables consistency to be ensure by, for example, a build pipeline configuration that can be taken from the metadata model, if the configuration is not derived from other sources (e.g., git repos, development project configuration). In some examples, and with regard to input for release and quality reporting, if a file-based model format is chosen, the model updater 402 can extract specific perspectives (comparable to the projections described in further detail herein) on the solution that are input for reports, and solution overarching change reports that can be used to underpin release decisions. For example, a flat list of components (with deltas from the previous version highlighted) can be used to enable cross-checks on completeness and change impact.

As described herein, the metadata model (CCM) of the present disclosure provides unprecedented flexibility and density of information, which introduces trade-offs with regard to concentrating on certain model aspects and perspectives. These trade-offs are overcome through the use of projection editors (e.g., the projection editor 406). The original idea of a projection editor stems from the realm of creating editors for programming languages and domain specific languages represented. Instead of displaying a syntax-highlighted text file, the text is persisted in an abstract syntax tree (AST, which is rather a tree of tokens). Now the visual representation can be adjusted almost arbitrarily as long as it adheres to the structure of the AST. A specific visual representation is called projection and can consist of colored text, graphical representations, tables, and the like.

For a file-based representation of the metadata model (CCM) of the present disclosure, the original file format can be retained and the AST is only an intermediate format. In this manner, a bi-directional mapping between AST and text is available and no further metadata is needed. In some examples, the projection editor 406 provides projection views of hierarchy, realm relationship, aspects, property reach, tree-diff, metadata of metadata, and value help. In some examples, hierarchy provides a tree-like, collapsible node structure. In some examples, realm relationship hides all properties and objects that do not exhibit relationships to other model realms. In this manner, relationships to PPMS, EARL, and SLM, for example, can be in focus. In some examples, aspect-related projections are provided in order to easily model, for example, deployment, provisioning, and monitoring. In some examples, property reach shows the reach of certain parameters or properties down the tree. An example is to show the closure of a cloud component that is tagged as deployUnit=true. This is to make sure that the closure is correct and only the correct component sub-trees are included. In some examples, tree-diff provides a specific tree-view exhibiting the difference between two trees. This can be used to understand the impact of changes. In some examples, in a typical perspective, the metadata of the metadata (e.g. specific types, value restrictions, default values) is hidden from the modeler. This projection shows this metadata of metadata. In some examples, value help presents different values that are defined for a property and can be presented in a drop-down list (this can even be done in a text-file representation).

As introduced above, the metadata model (CCM) provides a complete representation of a solution and is usable in management operations. Example management operations are described in further detail herein for purposes of non-limiting illustration. It is contemplated, however, that the metadata model can be used for any appropriate management operation. The example management operations include deployment and monitoring.

With regard to deployment, deployment makes use of specific aspect properties in associations that are encapsulated within the metadata model. In some examples, the deployment operation is executed on a tree of packages that are provided for the solution in question. Ideally, the package type is sufficient to determine the concrete deployment procedure to be used. The following properties of the metadata model enable selective annotation of the components for the most prominent exceptions to a default:

```
global.CloudComponent
  ...
  packages
  - name: Mtar &m
  - name: iFlow &1
  aspects
  - name: deployment
      isDeployUnit: boolean      # this component is always
                                 deployed as one e.g. MTA, Helm
                                 chart
                                 # regardless of the fact that
                                 there are potentially
                                 subcomponents
                                 # in the containment hierarchy
                                 of this component
      deployIF: string           #E.g. <k8s CRD Name> or
"k8sOperator"
      deployIFtype: string # e.g. CRD, k8sOperator, CF
Deploy service, ...
Global/contains
  aspects
  - name: deployment
      deployPriority: integer
      # = 1 cloud component that the association points to
is to be deployed first, then
      # all other cloudComponents in the sibling branches
of the tree. Use 2, 3, etc.
      # in order to define a sequence if necessary.
      deploy: boolean
      #indicated forced deployment also for dependencies
(indicated with contains.used = true)
```

The usage of externalizing an aspect to a cloud component (aspect and package pattern) is used to model, for example, K8S operators as one specific deployment mechanism. In a more general sense, the codified installation procedures and tools are modeled and treated as CloudComponent and do not need specific handling.

Before executing on the deployment aspect, not only the deployment targets have to be determined, but all degrees of freedoms need to be reduced. This includes that options are being taken (tobe.contains.OptionTaken), input parameters (if any) are provided, a hyperscaler variant must be chosen (if any variation is possible), and the like. Processing of the deployment metadata provided in the metadata model includes applying the hierarchy reach quality of the model. The processor traverses the whole tree to find the deployment aspects applied to the entire tree, if no exceptions (i.e., diverging definitions of the deployment aspect) are found further down the tree of CloudComponent entities.

With regard to monitoring, monitoring can include aspects of definition of exporters (e.g., Prometheus exporters) for collection of monitoring metrics, and definition of dashboards (e.g., Kibana Dashboards) for displaying the collected metrics. The complete monitoring description (e.g., provided in Javascript object notation (JSON format) inside the aspect. In some examples, a filename, if needed, can be generated based on the CloudComponent name and version that bears the definitions.

```
- name: prometheusExporters
    content: the whole definition if needed at this level
    firstcontent entity: sldfkj
- name: graphanaDashboards
```

-continued

```
    contentFormat: json
    content: 'the whole definition if needed at this
level
        {first content entity: sldkfslfj
        when applying: would transformed to json
        }'
- name: kibanaDashboards:
    contentFormat: json
    content: 'the whole definition if needed at this
level
        {first content entity: sdflksdf
        when applying: would transformed to json}'
```

As another example, the metadata model can be used to provide containerized application service views (CASs). A CAS provides a hierarchical depiction of K8S workload instead of plain lists of seemingly unrelated K8S resources. There are different node types defined (depending on the hierarchy level in which the node appears). All CAS aspects of a solution can be extracted from the metadata model and assembled into a CAS configuration file. This can be done by reusing the containment hierarchy of the cloud components. CCs without a CAS aspect would be omitted. FileName and filePath are used to indicate what should be generated.

```
global.CloudComponent
  ...
  aspects:
    -
      name: CAS
      casName: myK8sBasedProduct
      description: string
      fileName: string        #if omitted, fileName of ancestor
component (parent,
                              # grandparent, ...) assumed
      filePath: URI           # if omitted, filepath of ancestor
component assumed
      version: string         # version of the file, individual
                              entities are not
                              # foreseen with versions for the
                              time being
      nodeName: mySolution
      nodeType: solution
```

As described herein, implementations of the present disclosure provide one or more patterns. Example patterns include, without limitation, an aspects pattern, a metadata pattern, a package pattern, a variant pattern, a link pattern (for technical links between metadata models), and an automation support pattern.

An example aspect pattern can be provided as:

```
global.CloudComponent
  ....
  packages
  - name: Mtar &m
  - name: iFlow &1
  aspects
  - name: deployment              # mandatory: name of the
                                  aspect
  ...                             #
aspect specific properties
      deployIF: mtarDeployer      # specific:
                                  Deployment
                                  Interface/tool name
      content: cdata              # if the aspect
                                  contains inline
                                  metadata of
                                  arbitrary format
```

-continued

```
contentLink:        <filename>          #if metadata of
                                        the aspect is
                                        kept somewhere
                                        else
packageLink                             # optional, if only the
                                        subset of packages of the
                                        component are to be
                                        #considered, this should be
                                        an exception.
 - *m                                   #alternative 1: yaml reference
 - technicalContentType: string               #yaml, json,
                                        xml, ... in
                                        order to
                                        determine
                                        which
# parser would be needed for the inline content
 - name: provisioning
   provIF: iFlowProvisioning            #specific:
                                        provisioning
                                        interface/tool
                                        name
   packagelink
    - iFlow         # alternative 2: reference to
                    package name
   componentLink
```

In some implementations, aspects represent the metadata for specific LM processes and tasks. This metadata does not exist standalone, but are supposed to either be directly input (parameters, configuration, content) to tools supporting and automating the execution of the task. Depending on the tool and development process of this metadata, CCM provides the flexibility to accommodate the aspect. In further detail, aspects are lists of objects. Name and package links are general properties, other properties can be defined as needed for each aspect. Such a list is the compromise between having a dedicated and discoverable place for all aspects and the flexibility to accommodate the vast different properties and details of the different LM processes that are to be reflected in the aspects. Within the aspect objects, the definition of input parameters, that may be required from outside, are listed. The input parameter handling is not defined with this document since there are already other models available that can be used (e.g., with LSS).

With regard to metadata patterns, any model entity needs metadata about itself (e.g., type information, value restrictions, editing information). Some model notation languages (e.g., JSON, yaml) do not provide any mechanism, and others (e.g., XML) only foresee one level of attributes or a separate schema for describing the metadata. Still, it is beneficial to have the possibility particularly to better support automation of CRUD operations on one or multiple models by resolving ambiguities on the interpretation of the model data or in order to increase the degree of automation. The metadata pattern of the present disclosure provides a hierarchical schema for model properties, for example: <namespace>/<propertyName>/m/<metadataItem1>/m/<metadataItem1.1>: value. An example metadata pattern can be provided as:
    maxNumberOfTenants: 10
    maxNumberOfTenants/m/type: integer
    maxNumberOfTenants/m/max: 15
    maxNumberOfTenants/m/max/m/changeable: true
    maxNumberOfTenants/m/max/m/type: integer In some examples, the metadata pattern for a model entity is optional and can be used where helpful without imposing, for example, a parallel schema or a different model element syntax. This bears the advantage that the model implementations that cannot handle this type of metadata can just ignore the metadata by treating it as an object property (a name and value). The declaration of metadata is also self-contained such that sequence of appearance does not play a role and could appear anywhere in an object (e.g., at the end of the object declaration in a text-based representation of the model).

With regard to package patterns, packages are used for deployment processes. An example package pattern can be provided as:
    packageName: sring
    packagePath: string
    packageURI: URI
    packageContent: string
    packageContentType: string #json, yaml, a string of something else
    packageType: string #helm operator With regard to variant patterns, software solutions may differ in their implementation on different infrastructure. Some solution services (particularly backing services) may differ depending on the underlying hyperscaler. The difference may range from a couple of different property values, over additional/different properties to even entire components. Variations are introduced through variant patterns to express this notion. The entity can be attached to any CloudComponent or Association in order to apply to the containment tree spun below the component. The variant pattern is distributed to the global (solution definition) and toBe model (solution instances). An example variant pattern for the global model can be provided as:
    HyperscalerVariantDefinition
        Id=myExample
        Version=the context may change over time
        Values=list: AWS, Azure, . . .
An example variant pattern for the to-be model can be provided as:
    HyperscalerVariant
        gl.Id=myExample
        gl.Version=the context may change over time
        gl.Values=list: AWS, Azure, . . .
        value: AWS Automation support patterns can be described as inline annotation mechanisms that can be executed in order to automate both creating CCM data by reading external metadata sources (.get) or creating external metadata (.put) by reading CCM data. For example:
    #<<<<<<<<<<<< mappings for automation purposes
    name: myValue
    name.get: <xpath or MAL expression>#xpath or model access language (MAL) like query into the external metadata file. corresponding property is left empty.
    name.put: <xpath/MAL expression>

Figure 5:
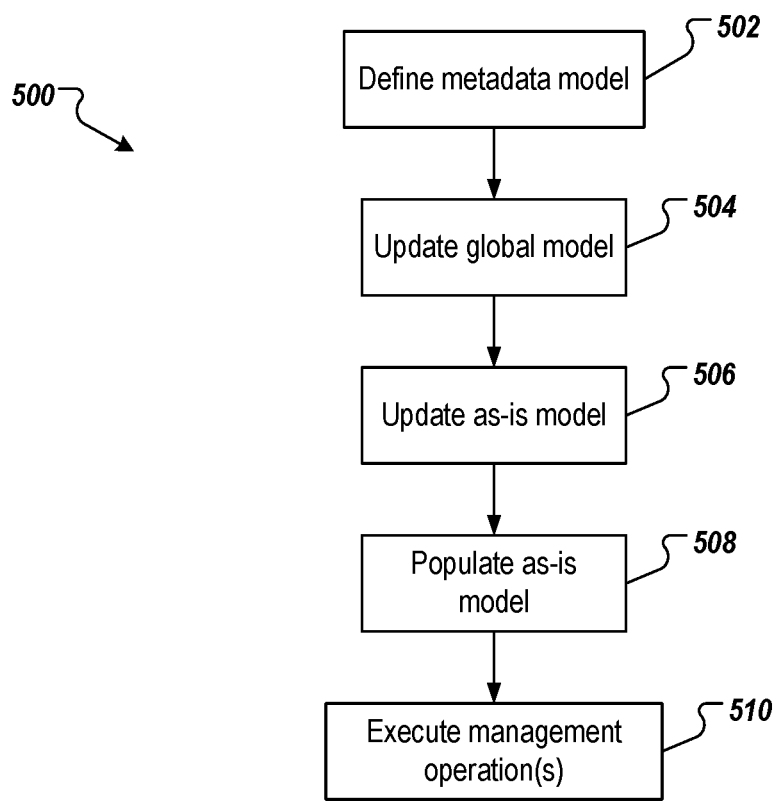
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A metadata model representative of a software solution is defined (502). The metadata model includes a global model, a to-be model, and an as-is model. As described herein, the metadata model represents the software solution as a tree of components using associations to provide recursiveness, the associations including a contains semantics association that establishes parent-child relationships between components and a uses semantics association that indicates whether components are included in the software solution or external to the software solution. The global model represents a high-level definition of the software solution including any optional components that can be included in the software solution at deployment for production use. The to-be model represents a variant of the software solution in relation to a deployment context. The as-is model represents actual deployment of the software solution to one or more instances of one or more cloud platforms. The global model includes a set of global entities and the to-be model includes a set of to-be entities, a first sub-set of to-be entities inheriting properties entities in the set of global entities, and a second sub-set of to-be entities comprising properties specific to the to-be model.

The global model is updated (504). For example, the global model is updated by a first model updater to include metadata generated during execution of a release pipeline associated with the software solution. In some examples, the global model is updated by receiving, by an update service of the first model updater, data from the release pipeline through a CLI of the first model updater, and executing at least one update operation on the global model in response to the data, the update service accessing the metadata model within a metadata model repository through a model plug-in.

The to-be model is updated (506). For example, the to-be model is updated by a second model updater to include metadata generated during execution of a deployment pipeline associated with the software solution. In some examples, the to-be model is updated by receiving, by an update service of the second model updater, data from the deployment pipeline through a CLI of the second model updater, and executing at least one update operation on the to-be model in response to the data, the update service accessing the metadata model within a metadata model repository through a model plug-in.

The as-is model is populated (508). For example, the as-is model is populated with metadata generated as a result of deployment of the software solution to the one or more cloud platforms, the as-is model identifying versions of components of the software solution and respective deploy targets, to which the components are deployed to. At least one management operation is executed on the software solution at least partially based on the metadata model (510). For example, the at least one management operation includes one of deployment, updating, patching, monitoring, and deleting.

Figure 6:
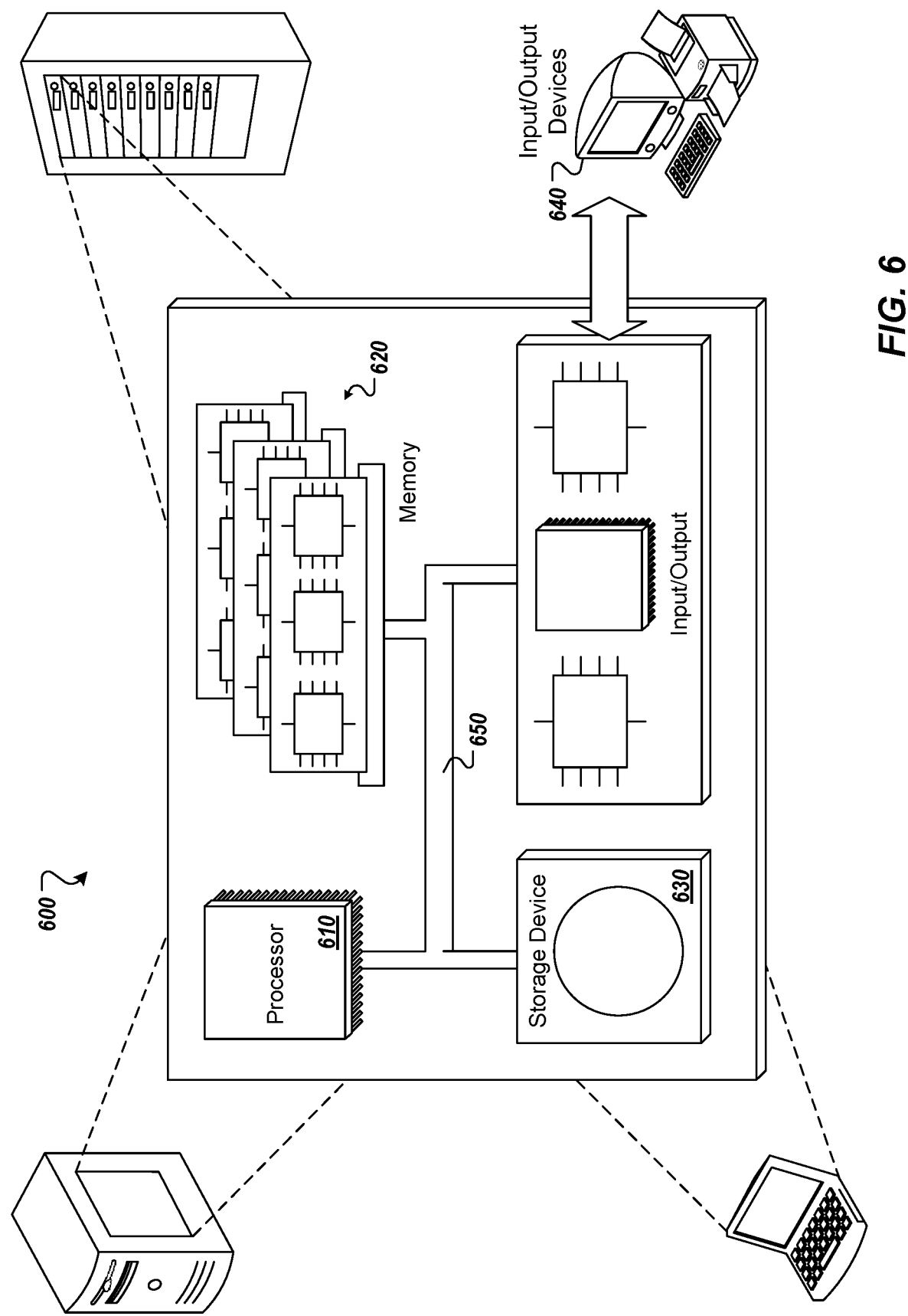
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing a software solution provisioned within one or more cloud platforms, the method being executed by one or more processors and comprising:
    defining a metadata model representative of the software solution, the metadata model comprising a global model, a to-be model, and an as-is model, the global model representing a high-level definition of the software solution including any optional components that can be included in the software solution at deployment for production use, the to-be model representing a variant of the software solution in relation to a deployment context, and the as-is model representing actual deployment of the software solution to one or more instances of the one or more cloud platforms;
    updating, by a first model updater, the global model to include metadata generated during execution of a release pipeline associated with the software solution;
    updating, by a second model updater, the to-be model to include metadata generated during execution of a deployment pipeline associated with the software solution;
    populating the as-is model with metadata generated as a result of deployment of the software solution to the one or more cloud platforms, the as-is model identifying versions of components of the software solution and respective deploy targets, to which the components are deployed to; and
    executing at least one management operation on the software solution at least partially based on the metadata model.

2. The method of claim 1, wherein the global model comprises a set of global entities and the to-be model comprises a set of to-be entities, a first sub-set of to-be entities inheriting properties entities in the set of global entities, and a second sub-set of to-be entities comprising properties specific to the to-be model.

3. The method of claim 1, wherein updating the global model comprises receiving, by an update service of the first model updater, data from the release pipeline through a command line interface (CLI) of the first model updater, and executing at least one update operation on the global model in response to the data, the update service accessing the metadata model within a metadata model repository through a model plug-in.

4. The method of claim 1, wherein updating the to-be model comprises receiving, by an update service of the second model updater, data from the deployment pipeline through a command line interface (CLI) of the second model updater, and executing at least one update operation on the to-be model in response to the data, the update service accessing the metadata model within a metadata model repository through a model plug-in.

5. The method of claim 1, wherein the metadata model represents the software solution as a tree of components using associations to provide recursiveness, the associations comprising a contains semantics association that establishes parent-child relationships between components and a uses semantics association that indicates whether components are included in the software solution or external to the software solution.

6. The method of claim 1, further comprising providing a projection editor that accesses the metadata model from a metadata model repository and that provides one or more projection views to enable a user to edit an abstract syntax tree (AST) representation of at least a portion of the metadata model, the one or more projection views comprising one or more of a hierarchy view, a realm relationship view, an aspects view, a property reach view, a tree-difference view, a metadata-of-metadata view, and a value-help view.

7. The method of claim 1, wherein the at least one management operation comprises one of deployment, updating, patching, monitoring, and deleting.

8. A non-transitory computer-readable storage medium coupled to one or more processors and having instructions stored thereon which, when executed by the one or more processors, cause the one or more processors to perform operations for managing a cloud-native software solution provisioned within one or more cloud platforms, the operations comprising:
    defining a metadata model representative of the software solution, the metadata model comprising a global model, a to-be model, and an as-is model, the global model representing a high-level definition of the software solution including any optional components that can be included in the software solution at deployment for production use, the to-be model representing a variant of the software solution in relation to a deployment context, and the as-is model representing actual deployment of the software solution to one or more instances of the one or more cloud platforms;
    updating, by a first model updater, the global model to include metadata generated during execution of a release pipeline associated with the software solution;
    updating, by a second model updater, the to-be model to include metadata generated during execution of a deployment pipeline associated with the software solution;
    populating the as-is model with metadata generated as a result of deployment of the software solution to the one or more cloud platforms, the as-is model identifying versions of components of the software solution and respective deploy targets, to which the components are deployed to; and
    executing at least one management operation on the software solution at least partially based on the metadata model.

9. The non-transitory computer-readable storage medium of claim 8, wherein the global model comprises a set of global entities and the to-be model comprises a set of to-be entities, a first sub-set of to-be entities inheriting properties entities in the set of global entities, and a second sub-set of to-be entities comprising properties specific to the to-be model.

10. The non-transitory computer-readable storage medium of claim 8, wherein updating the global model comprises receiving, by an update service of the first model updater, data from the release pipeline through a command line interface (CLI) of the first model updater, and executing at least one update operation on the global model in response to the data, the update service accessing the metadata model within a metadata model repository through a model plug-in.

11. The non-transitory computer-readable storage medium of claim 8, wherein updating the to-be model comprises receiving, by an update service of the second model updater, data from the deployment pipeline through a command line interface (CLI) of the second model updater, and executing at least one update operation on the to-be model in response to the data, the update service accessing the metadata model within a metadata model repository through a model plug-in.

12. The non-transitory computer-readable storage medium of claim 8, wherein the metadata model represents the software solution as a tree of components using associations to provide recursiveness, the associations comprising a contains semantics association that establishes parent-child relationships between components and a uses semantics association that indicates whether components are included in the software solution or external to the software solution.

13. The non-transitory computer-readable storage medium of claim 8, wherein operations further comprise providing a projection editor that accesses the metadata model from a metadata model repository and that provides one or more projection views to enable a user to edit an abstract syntax tree (AST) representation of at least a portion of the metadata model, the one or more projection views comprising one or more of a hierarchy view, a realm relationship view, an aspects view, a property reach view, a tree-difference view, a metadata-of-metadata view, and a value-help view.

14. The non-transitory computer-readable storage medium of claim 8, wherein the at least one management operation comprises one of deployment, updating, patching, monitoring, and deleting.

15. A system, comprising:
a computing device; and
a computer-readable storage device coupled to the computing device and having instructions stored thereon which, when executed by the computing device, cause the computing device to perform operations for natural language explanations for managing a cloud-native software solution provisioned within one or more cloud platforms, the operations comprising:
defining a metadata model representative of the software solution, the metadata model comprising a global model, a to-be model, and an as-is model, the global model representing a high-level definition of the software solution including any optional components that can be included in the software solution at deployment for production use, the to-be model representing a variant of the software solution in relation to a deployment context, and the as-is model representing actual deployment of the software solution to one or more instances of the one or more cloud platforms;
updating, by a first model updater, the global model to include metadata generated during execution of a release pipeline associated with the software solution;
updating, by a second model updater, the to-be model to include metadata generated during execution of a deployment pipeline associated with the software solution;
populating the as-is model with metadata generated as a result of deployment of the software solution to the one or more cloud platforms, the as-is model identifying versions of components of the software solution and respective deploy targets, to which the components are deployed to; and
executing at least one management operation on the software solution at least partially based on the metadata model.

16. The system of claim 15, wherein the global model comprises a set of global entities and the to-be model comprises a set of to-be entities, a first sub-set of to-be entities inheriting properties entities in the set of global entities, and a second sub-set of to-be entities comprising properties specific to the to-be model.

17. The system of claim 15, wherein updating the global model comprises receiving, by an update service of the first model updater, data from the release pipeline through a command line interface (CLI) of the first model updater, and executing at least one update operation on the global model in response to the data, the update service accessing the metadata model within a metadata model repository through a model plug-in.

18. The system of claim 15, wherein updating the to-be model comprises receiving, by an update service of the second model updater, data from the deployment pipeline through a command line interface (CLI) of the second model updater, and executing at least one update operation on the to-be model in response to the data, the update service accessing the metadata model within a metadata model repository through a model plug-in.

19. The system of claim 15, wherein the metadata model represents the software solution as a tree of components using associations to provide recursiveness, the associations comprising a contains semantics association that establishes parent-child relationships between components and a uses semantics association that indicates whether components are included in the software solution or external to the software solution.

20. The system of claim 15, wherein operations further comprise providing a projection editor that accesses the metadata model from a metadata model repository and that provides one or more projection views to enable a user to edit an abstract syntax tree (AST) representation of at least a portion of the metadata model, the one or more projection views comprising one or more of a hierarchy view, a realm relationship view, an aspects view, a property reach view, a tree-difference view, a metadata-of-metadata view, and a value-help view.

* * * * *